United States Patent
Tseng et al.

(10) Patent No.: US 6,870,662 B2
(45) Date of Patent: Mar. 22, 2005

(54) METHODS OF SURFACE MODIFICATION FOR IMPROVING ELECTROPHORETIC DISPLAY PERFORMANCE

(75) Inventors: Scott C-J Tseng, San Jose, CA (US); Jack Hou, Fremont, CA (US); Zarng-Arh George Wu, San Jose, CA (US); Xiaojia Wang, Fremont, CA (US); Rong-Chang Liang, Cupertino, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 39 days.

(21) Appl. No.: 10/429,016

(22) Filed: May 2, 2003

(65) Prior Publication Data

US 2003/0210455 A1 Nov. 13, 2003

Related U.S. Application Data

(60) Provisional application No. 60/377,390, filed on May 3, 2002.

(51) Int. Cl.[7] .......................... G02B 26/00; G09G 3/34; B32B 3/00
(52) U.S. Cl. ...................... 359/296; 345/107; 428/166; 428/156; 204/453; 204/604; 523/200; 525/374
(58) Field of Search ........................ 359/296; 345/107, 345/105, 84; 204/604, 453, 459, 548; 428/156, 166, 172; 523/200; 525/374

(56) References Cited

U.S. PATENT DOCUMENTS

| | | | |
|---|---|---|---|
| 3,668,106 A | 6/1972 | Ota ............................. | 204/299 |
| 4,071,430 A | 1/1978 | Liebert ........................ | 204/299 |
| 4,093,534 A | 6/1978 | Carter et al. ................. | 350/355 |
| 4,285,801 A | 8/1981 | Chiang ........................ | 204/299 |
| 4,680,103 A | 7/1987 | Beilin Solomon et al. .. | 204/299 |
| 5,380,362 A | 1/1995 | Schubert ..................... | 106/493 |
| 5,403,518 A | 4/1995 | Schubert ..................... | 252/572 |
| 5,573,711 A | 11/1996 | Hou et al. ................... | 252/572 |
| 5,914,806 A | 6/1999 | Gordon II et al. .......... | 359/296 |
| 5,930,026 A | 7/1999 | Jacobson et al. ........... | 359/296 |

(List continued on next page.)

FOREIGN PATENT DOCUMENTS

| | | | |
|---|---|---|---|
| JP | 59 171931 A | 9/1984 | |
| WO | WO 01/067170 | 9/2001 | ............ G02F/1/167 |
| WO | WO 02/01281 | 1/2002 | ............. G02F/1/00 |
| WO | WO 02/056097 | 7/2002 | ......... G02F/1/1333 |
| WO | WO 02/65215 | 8/2002 | ............. G03F/7/20 |

OTHER PUBLICATIONS

U.S. Appl. No. 60/345,934, filed Jan. 2002, Chen, et al.
U.S. Appl. No. 60/345,936, filed Jan. 2002, Chen, et al.

(List continued on next page.)

*Primary Examiner*—Loha Ben
(74) *Attorney, Agent, or Firm*—Howrey Simon Arnold & White LLP

(57) ABSTRACT

The present invention is directed to methods for improving the performance of an electrophoretic display by modifying the display cell surface. More specifically, the methods are directed to modification of the microcup surface after the microcups are released from the mold. The microcups which have undergone any of the treatment methods of the invention show significant improvement in their surface properties, such as chemical functionality, surface roughness, surface tension, morphology, surface charge, surface reflectivity, surface conductivity and optical properties, particularly optical density in the visible light region. An electrophoretic display formed from the treated microcups has many advantages. For example, the display shows a higher contrast ratio, lower electro-optic response time, lower driving voltage, longer shelf life, higher image-increasing bistability and higher threshold voltage. In addition, it exhibits an improved image quality by reducing undesirable scum formation or irreversible particle deposition on the microcup surface.

63 Claims, 4 Drawing Sheets

U.S. PATENT DOCUMENTS

| | | | | |
|---|---|---|---|---|
| 5,961,804 | A | 10/1999 | Jacobson et al. | 204/606 |
| 6,017,584 | A | 1/2000 | Albert et al. | 427/213.3 |
| 6,751,007 | B2 * | 6/2004 | Liang et al. | 359/296 |
| 6,751,008 | B2 * | 6/2004 | Liang et al. | 359/296 |
| 6,753,067 | B2 * | 6/2004 | Chen et al. | 428/166 |
| 2002/0126249 | A1 | 9/2002 | Liang et al. | 349/187 |
| 2002/0182544 | A1 | 12/2002 | Chan-Park et al. | 430/311 |
| 2003/0169227 | A1 | 9/2003 | Wu et al. | 345/107 |

OTHER PUBLICATIONS

Chen, S.M. (May, 2003) The New Applications and the Dynamics of Companies. *TRI.* 1–10. (In Chinese, English abstract attached, full translation available upon request).

Liang, R.C., Hou, J., Zang, H.M., Chung, J., & Tseng, S. (2003). Microcup(R) displays : Electronic Paper by Roll–to–Roll Manufacturing Processes. *Journal of the SID,* 11(4), 621–628.

Nikkei Microdevices. (Dec., 2002) Newly–Developed Color Electronic Paper Promises—Unbeatable Production Efficiency. *Nikkei Microdevices, 3.* (in Japanese, with English translation).

Dalisa, A.L. "Electrophoretic Display Technology" *IEEE Trans. Electron Devices,* ED–24 827–834 (1977).

Hopper, M., et al. "An Electrophoretic Display, Its Properties, Model and Addressing" *IEEE Trans. Electr. Dev.* 26(8):1148–1152 (1979).

Liang, R.C et al., "Microcup Electrophoretic Displays by Roll–to–Roll Manufacturing Processes" *Proc. of the IDW'02,* International Conference Center Hiroshima (Dec. 4–6, 2002).

Liang, R.C., "Microcup® Electrophoretic and Liquid Crystal Displays by Roll–to–Roll Manufacturing Process" *USDC Flexible Microelectronics & Displays Conference* Phoenix, AZ (Feb. 2–4, 2003).

Liang, R.C. et al., "Passive Matrix Microcup® Electrophoretic Displays" *Proc. of the IDMC'03,* Taipei International Convention Center Taiwan (Feb. 18–21, 2003).

Liang, R.C. et al., "Microcup® LCD ANew Type of Dispersed LCD by A Roll–to–Roll Manufacturing Process" *Proc. of the IDCM'03,* Taipei International Convention Center Taiwan (Feb. 18–21, 2003).

Murau, P. et al. "The Understanding and Elimination of Some Suspension instabilities in an Electrophoretic Display" *Journal of Applied Physics* 49(9):4820–4829 (1978).

U.S. Appl. No. 10/335,051, filed Dec. 31, 2002, (not published, available upon request).

U.S. Appl. No. 9/518,488, filed Mar. 3, 2000, (not published, available upon request).

U.S. Appl. No. 09/606,654, filed Jun. 28, 2000, (not published, available upon request).

* cited by examiner

METHODS OF SURFACE MODIFICATION FOR IMPROVING ELECTROPHORETIC DISPLAY PERFORMANCE

CROSS-REFERENCE TO RELATED APPLICATION

This application claims the benefit of U.S. Provisional Application Ser. No. 60/377,390, filed May 3, 2002, the content of which is incorporated herein by reference in its entirety.

BACKGROUND OF THE INVENTION

An electrophoretic display (EPD) is a non-emissive device based on the electrophoresis phenomenon influencing charged pigment particles suspended in a colored dielectric solvent. This general type of display was first proposed in 1969. An EPD typically comprises a pair of opposed, spaced-apart plate-like electrodes, with spacers predetermining a certain distance between the electrodes. At least one of the electrodes, typically on the viewing side, is transparent.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD (M. A. Hopper and V. Novotny, IEEE Trans. Electr. Dev., Vol. ED 26, No. 8, pp. 1148–1152 (1979)) and the microencapsulated EPD (U.S. Pat. Nos. 5,961,804 and 5,930,026).

An improved EPD technology was recently disclosed in co-pending applications, U.S. Ser. No. 09/518,488, filed on Mar. 3, 2000 (corresponding to WO 01/67170 published on Sep. 13, 2001), U.S. Ser. No. 09/759,212, filed on Jan. 11, 2001 (corresponding to WO 02/56097), U.S. Ser. No. 09/606,654, filed on Jun. 28, 2000 (corresponding to WO 02/01281 published on Jan. 3, 2002) and U.S. Ser. No. 09/784,972, filed on Feb. 15, 2001 (corresponding to WO 02/65215), all of which are incorporated herein by reference. The improved EPD comprises isolated cells formed from microcups of well-defined shape, size and aspect ratio and filled with charged particles dispersed in a dielectric solvent, preferably a halogenated solvent, particularly a perfluorinated solvent. The filled cells are individually sealed with a polymeric sealing layer, preferably formed from a composition comprising a material selected from a group consisting of thermoplastics, thermosets and precursors thereof. The microcup based display cells may be manufactured by microembossing or photolithography.

To improve the image quality and longevity of the electrophoretic displays, the surface properties of the microcup must be optimized to reduce the undesirable irreversible particle deposition or network formation. To achieve optimum switching performance, the dielectric properties and/or conductivity of the microcup material and its interaction with the electrophoretic fluid also need to be optimized. However, to facilitate mold release during microembossing, a releasing agent such as a silicone oil, a perfluoro compound or vinyl or acrylate derivatives thereof is often applied to the mold or incorporated in the embossing resin composition. The requirement of a good mold release property unfortunately tends to result in a low surface tension and hydrophobic microcup surface of a low dielectric constant which severely narrows the processing and formulation windows for acceptable display performance.

SUMMARY OF THE INVENTION

The present invention is directed to methods for improving the performance of an electrophoretic display by modifying the display cell surface. More specifically, when the display cells are prepared by the microcup technology utilizing the embossing process, the methods are directed to modification of the microcup surface after the microcups are released from the mold. While the term "microcup" is used in the present application, it is understood that the scope of the invention encompasses display cells of all types.

In the first aspect of the invention, a method is directed to the plasma treatment of the microcup surface with electron donating or proton accepting probe molecules.

In the second aspect of the invention, a method is directed to the plasma treatment of the microcup surface with electron accepting or proton donating probe molecules.

In these two aspects of the invention, the plasma treatment is performed to induce surface charge on the microcup surface to modulate its interaction with the charged pigment particles. The treatment may be performed to induce a positive surface charge or a negative charge on the microcup surface.

As a result of the treatment of the first or second aspect of the invention, an electrophoretic display may comprise a charged microcup surface and oppositely charged pigment particles (e.g., a positively charged microcup surface and negatively charged pigment particles or a negatively charged microcup surface and positively charged pigment particles) or a charged microcup surface and like-charged pigment particles (e.g., a positively charged microcup surface and positively charged pigment particles or a negatively charged microcup surface and negatively charged pigment particles).

In the third aspect of the invention, a method is directed to modification of the chemical functionality of the microcup surface by plasma treatment to induce interaction such as hydrogen bonding or acid-base interaction between the pigment particles and the microcup surface.

In a fourth aspect of the invention, a method is directed to modification of the chemical functionality of the microcup surface by plasma treatment to form a steric stabilization or protective colloid layer on the microcup surface.

In the fifth aspect of the invention, a method is directed to treating the microcup surface with a staining agent such as a solution or dispersion of carbon black, graphite, $RuO_4$, $MnO_4^{-1}$, $Cr_2O_7^{-2}$ or $OsO_4$ to darken the microcup surface and/or improve the interaction with the pigment particles.

In the sixth aspect of the invention, a method is directed to treating the microcup surface with a strong acid or base such as $H_2SO_4$, $HCl$, $HNO_3$, $KOH$, $K_2CO_3$, $NH_4OH$, ethylene diamine, diethylenetriamine or polyimine to induce surface functionality and microstructure.

In the seventh aspect of the invention, a method is directed to treating the microcup surface by sputtering, vapor deposition or electrodeposition of a metal or metal oxide to alter the conductivity, optical density and/or reflectivity of the microcup surface.

The microcups which have undergone any of the treatment methods of the invention show significant improvement in their surface properties, such as chemical functionality, surface roughness, surface tension, morphology, surface charge, surface reflectivity, surface conductivity and optical properties, particularly optical density in the visible light region. As a result, an electrophoretic display formed from the treated microcups has many advantages. For example, the display shows a higher contrast ratio, lower electro-optic response time, lower driving voltage, longer shelf life, higher image bistability and higher threshold voltage. In addition, it exhibits an improved image quality by reducing undesirable scum formation or irreversible particle deposition on the microcup surface. The surface modification also considerably improves the coating and/or adhesion quality in the filling and sealing steps. All of these improvements may be achieved without any compromise in mold release.

DETAILED DESCRIPTION OF THE INVENTION

I. Definitions

Unless defined otherwise in this specification, all technical terms are used herein according to their conventional definitions as they are commonly used and understood by those of ordinary skill in the art.

The term "microcup" refers to the cup-like indentations created by microembossing or photolithography as illustrated in WO01/67170.

The term "threshold voltage" refers to the maximum bias voltage that may be applied to a cell without causing undesired movement of particles between two electrodes on opposite sides of the cell.

The term "Dmax" means the maximum achievable optical density of the display.

The term "Dmin" means the minimum optical density of the display background.

The term "contrast ratio" means the ratio of the reflectance of the Dmin state to the reflectance of the Dmax state.

II. Preparation of the Display Cells

Figure 1:
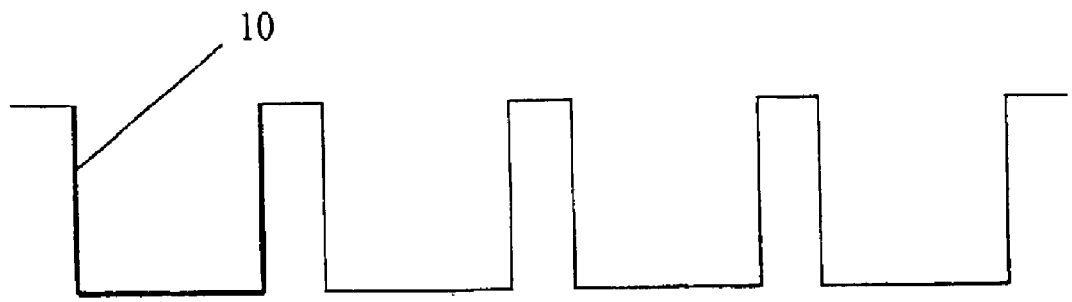
FIG. 1 depicts a typical array of microcups.

The electrophoretic display cells may be prepared by microembossing or photolithography as illustrated in WO 01/67170. Briefly, a transparent conductive substrate is constructed by forming a transparent conductor film on a glass plate or a plastic substrate. A layer of a thermoplastic or thermoset precursor is then coated on the conductor film. The thermoplastic or thermoset precursor layer is embossed by a male mold at a temperature higher than the glass transition temperature (or Tg) of the thermoplastic or thermoset precursor layer in the form of a roller, plate or belt. The thermoplastics or thermoset precursor for the preparation of the microcups may be multifunctional acrylate or methacrylate, vinylether, epoxide or oligomers or polymers thereof, and the like. Multifunctional acrylate and oligomers thereof are the most preferred. A combination of a multifunctional epoxide and a multifunctional acrylate is also very useful to achieve desirable physicomechanical properties. A crosslinkable oligomer imparting flexibility, such as urethane acrylate or polyester acrylate, is usually also added to improve the flexure resistance of the embossed microcups. The composition may comprise an oligomer, a monomer, additives, and optionally a polymeric binder or thickener. The glass transition temperatures (or Tg) for this class of materials usually range from about −70° C. to about 150° C., preferably from about −20° C. to about 50° C. The microembossing process is typically carried out at a temperature higher than the glass transition temperature. A heated male mold or a heated housing substrate against which the mold presses may be used to control the microembossing temperature and pressure. The male mold is released during or after the precursor layer is hardened to reveal an array of microcups (shown in FIG. 1). The hardening of the precursor layer may be accomplished by cooling, solvent evaporation, cross-linking or polymerization by radiation, heat or moisture. If the hardening of the thermoset precursor is accomplished by UV radiation, UV may radiate through the transparent conductor film. Alternatively, UV lamps may be placed inside the mold. In this case, the mold must be transparent to allow the UV light to radiate through the pre-patterned male mold onto the thermoset precursor layer.

III. Preparation of the Electrophoretic Dispersion

The microcups thus prepared are filled with charged pigment particles dispersed in a dielectric solvent. The dispersion may be prepared according to methods well known in the art, such as U.S. Pat. Nos. 6,017,584, 5,914,806, 5,573,711, 5,403,518, 5,380,362, 4,680,103, 4,285,801, 4,093,534, 4,071,430, 3,668,106 and *IEEE Trans. Electron Devices*, ED-24, 827 (1977), and *J. Appl. Phys.* 49(9), 4820 (1978). The charged pigment particles visually contrast with the medium in which the particles are dispersed. The medium usually is a dielectric solvent or solvent mixture which preferably has a low viscosity and a dielectric constant in the range of about 1.5 to about 30, preferably about 2 to about 15 for high particle mobility. Examples of suitable dielectric solvents include hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene and perfluoro solvents such as FC-43™, FC-70™ and FC-5060™ from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden™ from Ausimont or Krytox™ Oils and Greases K-Fluid Series from DuPont, Del. In one preferred embodiment, poly (chlorotrifluoroethylene) is used as the dielectric solvent. In another preferred embodiment, poly(perfluoropropylene oxide) is used as the dielectric solvent.

The suspending medium may be colored by dyes or pigments. Nonionic azo and anthraquinone dyes are particularly useful. Examples of useful dyes include, but are not limited to, Oil Red EGN, Sudan Red, Sudan Blue, Oil Blue, Macrolex Blue, Solvent Blue 35, Pylam Spirit Black and Fast Spirit Black from Pylam Products Co., Arizona, Sudan Black B from Aldrich, Thermoplastic Black X-70 from BASF, anthraquinone blue, anthraquinone yellow 114, anthraquinone reds 111 or 135 and anthraquinone green 28 from Aldrich. In the case of a pigment, the pigment particles for generating the color of the medium may also be dispersed in the dielectric medium. These color particles are preferably uncharged. If the pigment particles for generating color in the medium are charged, they preferably carry a charge which is opposite from that of the charged pigment particles. If both types of pigment particles carry the same charge, then they should have sufficiently different charge density or different electrophoretic mobility. Perfluorinated dyes or pigments are particularly useful when a perfluorinated liquid is used as the dielectric solvent. In any case, the dye or pigment for generating color of the medium must be chemically stable and compatible with other components in the suspension.

The charged pigment particles may be organic or inorganic pigments, such as $TiO_2$, phthalocyanine blue, phthalocyanine green, diarylide yellow, diarylide MOT yellow, and quinacridone, azo, rhodamine and perylene pigment series from Sun Chemical, Hansa yellow G particles from Kanto Chemical and Carbon Lampblack from Fisher. Submicron particle size is preferred. The particles should have acceptable optical characteristics, should not be swollen or softened by the dielectric solvent, and should be chemically stable. The resulting suspension must also be stable against sedimentation, creaming or flocculation under normal operating conditions.

The pigment particles may exhibit a native charge, or may be charged explicitly using a charge control agent, or may acquire a charge when suspended in the dielectric solvent. Suitable charge control agents are well known in the art. They may be polymeric or non-polymeric in nature, and may also be ionic or non-ionic, including ionic surfactants such as Aerosol OT, sodium dodecylbenzenesulfonate, metal soap, polybutene succinimide, maleic anhydride copolymers, vinylpyridine copolymers, vinylpyrrolidone copolymer (such as Ganex™ from International Specialty Products), (meth)acrylic acid copolymers and N,N-dimethylaminoethyl (meth)acrylate copolymers. Fluorosurfactants are particularly useful as charge control agents in fluorocarbon solvents. These include FC™ fluorosurfactants such as FC-170C, FC-171, FC-176, FC430, FC431 and FC-740 from 3M Company and Zonyl™ fluorosurfactants such as Zonyl™ FSA, FSE, FSN, FSN-100, FSO, FSO-100, FSD and UR from Dupont. The charge control agents may carry a positive charge, a negative charge or both (i.e., an "amphoteric" charge control agent).

Suitable charged pigment dispersions may be manufactured by any of the well-known methods including grinding, milling, attriting, microfluidizing and ultrasonic techniques. For example, pigment particles in the form of a fine powder are added to the suspending solvent and the resulting mixture is ball milled or attrited for several hours to break up the highly agglomerated dry pigment powder into primary particles. Although less preferred, a dye or pigment for generating color of the suspending medium may be added to the suspension during the ball milling process.

Sedimentation or creaming of the pigment particles may be eliminated by microencapsulating the particles with suitable polymers to match the specific gravity to that of the dielectric solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation. Improved processes of making density-matched pigment microcapsules of high electrophoretic mobility involving the use of reactive protective colloids and charge controlling agents are disclosed in co-pending U.S. Ser. No. 60/345,936 filed on Jan. 3, 2002, U.S. Ser. No. 10/335,210 filed Dec. 31, 2002, U.S. Ser. No. 60/345,934 also filed on Jan. 3, 2002 and U.S. Ser. No. 10/335,051 filed Dec. 31, 2002, all of which are incorporated herein by reference.

For a black/white electrophoretic display, the suspension comprises charged white particles of titanium oxide ($TiO_2$) dispersed in a dielectric solvent blackened by a black colorant dissolved or dispersed. A black dye or dye mixture such as Pylam Spirit Black and Fast Spirit Black from Pylam Products Co. Arizona, Sudan Black B from Aldrich, Thermoplastic Black X-70 from BASF, or a black pigment such as carbon black may be used to generate the black color of the solvent. Perfluorinated dyes or pigments are particularly useful when a perfluorinated liquid is used as the dielectric solvent. For other colored suspensions, there are many possibilities. For a subtractive color system, the charged $TiO_2$ particles may be suspended in a dielectric solvent of cyan, yellow or magenta color. The cyan, yellow or magenta color may be generated via the use of a dye or a pigment. For an additive color system, the charged $TiO_2$ particles may be suspended in a dielectric solvent of red, green or blue color generated via the use of a dye or a pigment. The red, green and blue color system is preferred for most applications.

IV. Sealing of the Microcup-based Display Cells

The microcups are filled with an electrophoretic dispersion of charged pigment particles in a dielectric solvent or solvent mixture, and then sealed with a sealing composition. The sealing can be accomplished by a variety of ways. Preferably, it is accomplished by overcoating the filled microcup array with a sealing composition comprising a solvent and a material selected from the group consisting of a rubber material preferably a thermoplastic elastomer, polyvalent acrylate or methacrylate, cyanoacrylates, polyvalent vinyl including vinylbenzene, vinylsilane and vinylether, polyvalent epoxide, polyvalent isocyanate, polyvalent allyl, oligomers or polymers containing crosslinkable functional groups, and the like. Additives such as a polymeric binder or thickener, photoinitiator, catalyst, filler, colorant and surfactant may be added to the sealing composition to improve the physicomechanical properties and the optical properties of the display. The sealing composition is incompatible with the electrophoretic fluid and has a specific gravity lower than that of the electrophoretic fluid. Upon solvent evaporation, the sealing composition forms a conforming seamless seal on top of the filled microcups. The sealing layer may be further hardened by heat, radiation or other curing methods. Sealing with a composition comprising a thermoplastic elastomer is particularly preferred. Examples of thermoplastic elastomers include tri-block or di-block copolymers of styrene and isoprene, butadiene or ethylene/butylene, such as the Kraton™ D and G series from Kraton Polymer Company. Crystalline rubbers such as poly (ethylene-co-propylene-co-5-methylene-2-norbornene) and other EPDMs (Ethylene Propylene Diene Rubber terpolymer) from Exxon Mobil have also been found very useful. Satisfactory sealing has been achieved by using an overcoat composition comprising a rubber material of this type.

Alternatively, the sealing composition may be dispersed into an electrophoretic fluid and filled into the microcups. The sealing composition is incompatible with the electrophoretic fluid and is lighter than the electrophoretic fluid. Upon phase separation and solvent evaporation, the sealing composition floats to the top of the filled microcups and forms a seamless seal thereon. The sealing layer may be further hardened by heat, radiation or other curing methods.

Figure 2:
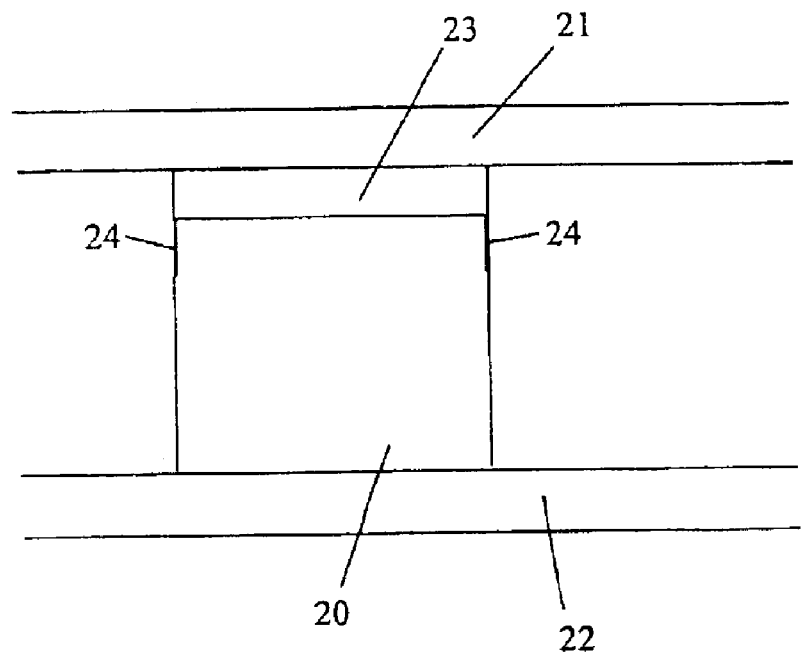
FIG. 2 depicts a typical display cell prepared by the microcup technology.

A typical display cell prepared by the microcup technology is depicted in FIG. 2. The cell (20) is sandwiched between two electrode plates (21, 22), at least one of which is transparent (21). The cell is filled with an electrophoretic dispersion and sealed with a polymeric sealing layer (23).

V. Surface Modification of the Invention

The present invention relates to treatment of the microcup surface (10 in FIG. 1) to improve the display performance by modifying its chemical functionality, morphology, microstructure, charge characteristics, surface tension or optical density.

Figure 3A:
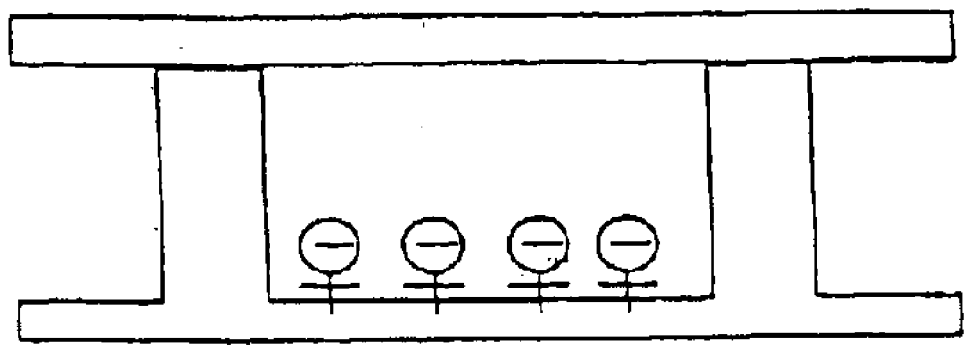
FIGS. 3a and 3b illustrate a positively charged surface of a display cell, after plasma treatment.
Figure 3B:
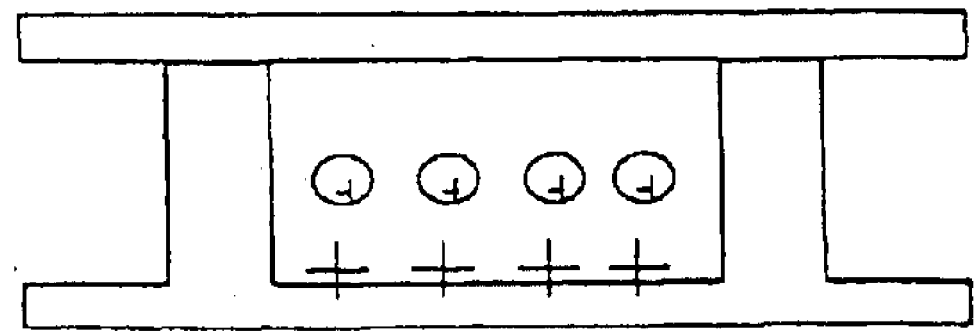

In one aspect of the invention, the surface treatment of the microcup involves plasma treatment with electron donating or proton accepting probe molecules or precursors thereof, including but are not limited to, ammonia, amines, imines, pyridines, ureas, thioureas, urethanes, pyrrolidones, imidazoles, ethers, thioethers, ketones, acrylates and acrylamides. The treated microcups show an improved affinity to pigment particles having an electron acceptor or proton donor on the particle surface. If the electron acceptor or proton donor is present in the continuous phase of the electrophoretic fluid, the treated microcup surface exhibits the characteristics of a positive charge. Depending on the charge characteristics of the pigment particles, the treated microcups may either show stronger or weaker affinity to the particles (FIGS. 3a and 3b).

Figure 4A:
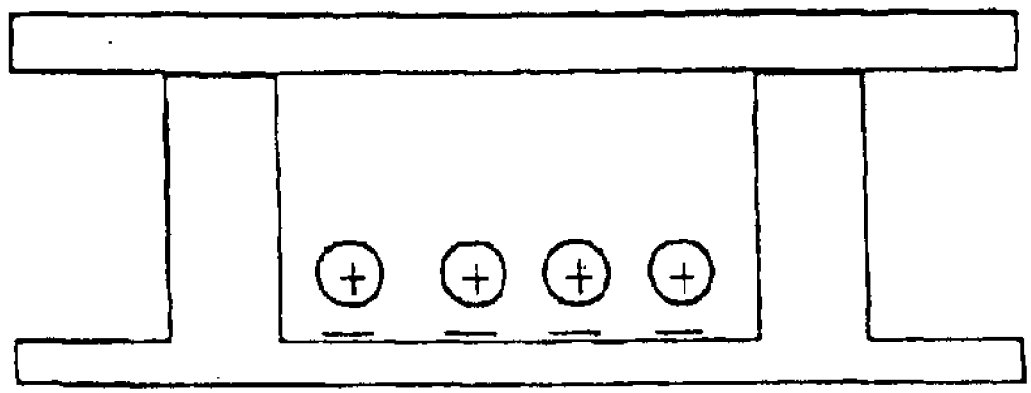
FIGS. 4a and 4b illustrate a negatively charged surface of a display cell, after plasma treatment.
Figure 4B:
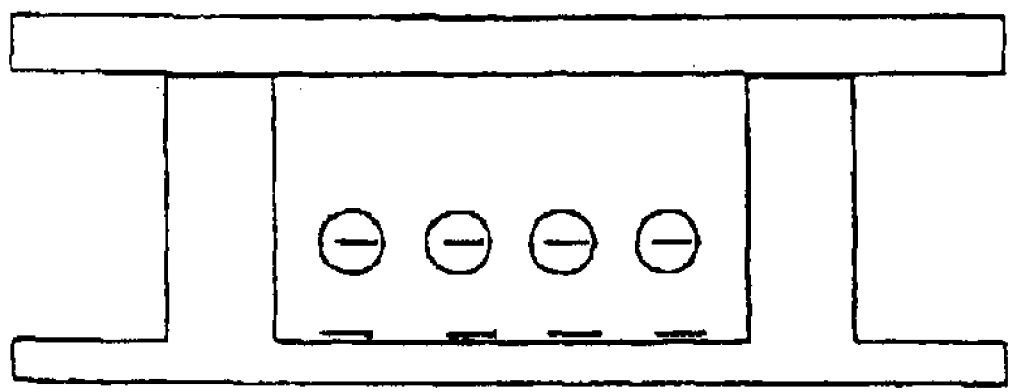

In second aspect of the invention, the surface treatment of the microcup involves plasma treatment with electron accepting or proton donating probe molecules or precursors thereof, including but are not limited to, oxygen, carboxylic compounds such as acrylic acid, methacrylic acid, maleic acid or itaconic acid; hydroxy containing compounds such as 2-hydroxyethylacrylate or 2-hydroxyethyl methacrylate; acrylamides; silanols; organometallic compounds comprising an electron deficient center, including but are not limited to, organotins, organotitaniums, organoaluminums, organoborons and the like. The treated microcups show an improved affinity to pigment particles having an electron donor or proton acceptor on the particle surface. If an electron donor or proton acceptor is present in the continuous phase of the electrophoretic fluid, the treated microcup surface exhibits the characteristics of a negative charge. Depending on the charge characteristics of the pigment particles, the treated microcups may either show stronger or weaker affinity to the particles (FIGS. 4a and 4b).

In these two aspects of the invention, the plasma treatment is performed to induce surface charge on the microcup surface to modulate its interaction with the charged pigment particles. The treatment may be performed to induce a positive surface charge or a negative charge on the microcup surface.

As a result of the treatment of the first or second aspect of the invention, an electrophoretic display may comprise a charged microcup surface and oppositely charged pigment particles (e.g., a positively charged microcup surface and negatively charged pigment particles or a negatively charged microcup surface and positively charged pigment particles) or a charged microcup surface and like-charged pigment particles (e.g., a positively charged microcup surface and positively charged pigment particles or a negatively charged microcup surface and negatively charged pigment particles).

Figure 5:
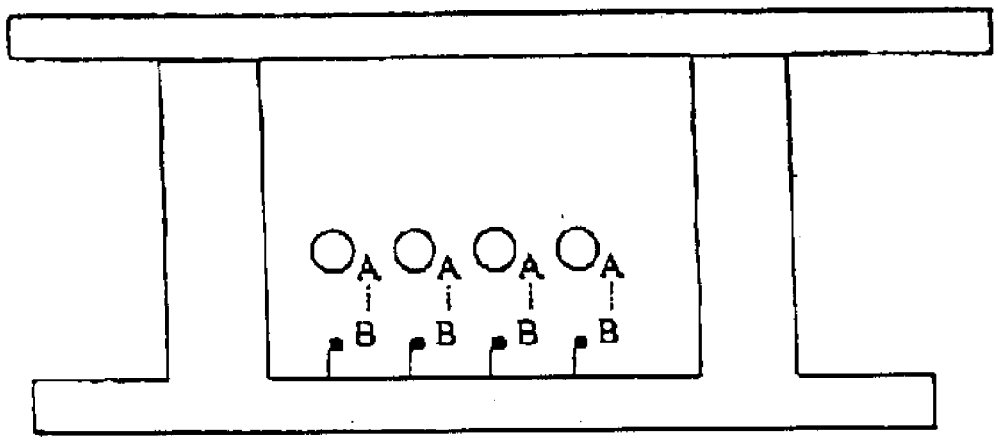
FIG. 5 illustrates molecule-molecule interaction between a cell surface and surface of the pigment particles, as a result of plasma treatment of the cell surface.

In the third aspect of the invention, a method is directed to modification of the chemical functionality of the microcup surface by plasma or corona treatment to induce interaction between the pigment particles and the microcup surface. One specific example is to modify the microcup surface by plasma treatment using probe molecules having a functional group which is capable of forming a hydrogen bonding or acid-base reaction with a functional group on the surface of the dispersed particles as shown in FIG. 5. The hydrogen bonding may be formed from a proton donor or electron acceptor on the microcup surface and a proton acceptor or electron donor on the particles, or vice versa. Alternatively, both donor and acceptor functional groups may be present on either surface. Especially preferred functional groups for hydrogen bonding or acid base interaction include —OH, —SH, —NH, =N—, —O—, —S—, =CO, =CS, —CO$_2$—, —CONH—, —NHCONH—, —NHCOO— and the like. The degree of interaction between the cell surface and particle surface can be controlled by adjusting the amount of probe molecules grafted on the cell surface or the type of probe molecules used for plasma treatment.

Figure 6:
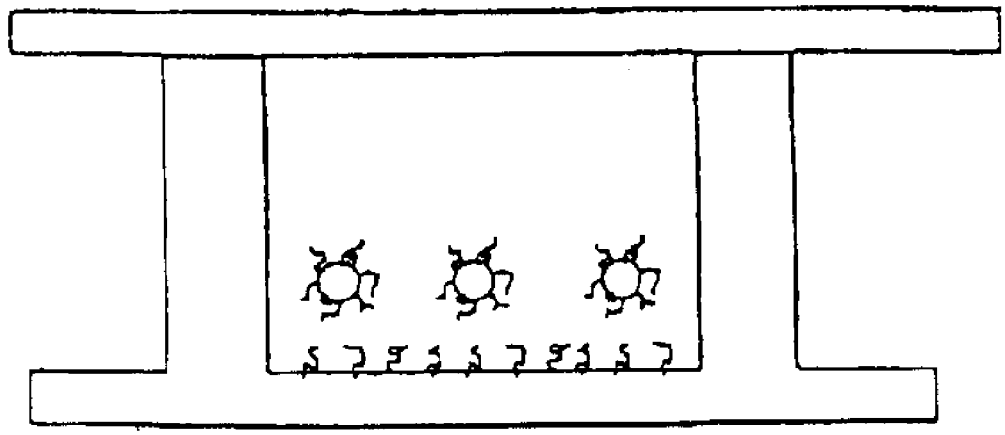
FIG. 6 illustrates a steric stabilization or protective colloid layer formed on the surface of a display cell, after plasma treatment.

In a fourth aspect of the invention, a method is directed to modification of the chemical functionality of the microcup surface by plasma treatment to form a steric stabilization or protective colloid layer on the cell surface (FIG. 6). Such a steric stabilization or protective colloid layer reduces undesirable irreversible deposition of pigment particles on the surface of the microcups and significantly improves the image uniformity, response time and contrast ratio of the display. Preferably the treated microcup surface is highly compatible with the dielectric solvent in the electrophoretic fluid. When a perfluorinated solvent is used, fluorinated compounds are particularly useful as the probe molecules for the plasma treatment. Suitable fluorinated compounds include, but are not limited to, fluorinated acrylates or methacrylates such as 2,2,3,3,3-pentafluoropropyl acrylate, 1H,1H,-heptafluorobutyl methacrylate, 1H,1H,-heptafluorobutyl acrylate or 1H,1H,7H-dodecafluoroheptyl acrylate; fluorinated vinyls such as perfluoropropylene, perfluorobutylene-1, perfluoroheptene-1, allyl-1H,1H-perfluorooctyl ether, 2H-hexafluoropropyl allyl ether, bis(perfluorooctyl)maleate, mono-perfluorooctyl itaconate, bis(perfluorooctyl)itaconate, 2-chloroheptafluoro-2-butene, 2-chloropentafluoro-1,3-butadiene or 1,8-divinylperfluorooctane; fluorinated epoxides such as perfluorinated propylene oxide or 2(1H,1H-nonafluoropentyl)oxirane; and derivatives thereof.

The microcups which have undergone any of the treatment methods of the invention show significant improvement in at least one of the following desirable surface properties for optimum display performance, such as surface tension, morphology, surface charge, surface reflectivity, surface conductivity and optical properties, particularly optical density in the visible light region. As a result, an electrophoretic display formed from the treated microcups has many advantages. In many cases, the display shows a higher contrast ratio, lower electro-optic response time, lower driving voltage, longer shelf life, higher image bistability and higher threshold voltage. In addition, it exhibits an improved image quality by reducing undesirable scum formation or irreversible particle deposition on the microcup surface. The plasma surface treatment also considerably improves the coating and/or adhesion quality in the filling and sealing steps. All of these improvements may be achieved without any compromise in mold release.

The optimum dosage of the probe molecules is determined by certain factors including the applied power, process pressure, flow-rate of the probe molecules, carrier gas and the application duration time. The plasma treatment for 1 cubic foot plasma chamber is generally carried out by applying the probe molecules at a rate of 5 to 25 milliliter per hour, preferably 5 to 15 milliliter per hour, with the aid of a carrier gas such as argon under a pressure of 30 to 300 mtorr, preferably 60 to 200 mtorr. The carrier gas usually has a flow rate of 10 to 100 SCCM (standard cubic centimeter per minute), preferably 10 to 50 SCCM. The power applied is usually in the range of from 50 to 400 watts. The duration of application is in the range of 2 to 10 minutes, preferably from 2 to 5 minutes.

Before plasma treatment using the probe molecules, the surface of the cells may be pretreated with an oxygen plasma at a oxygen flow rate of 100 to 500 SCCM, preferably 200 to 300 SCCM under a pressure of 100 to 400 mtorr, preferably 100 to 200 mtorr. The power applied is in the range of 50 to 400 watts. The duration of the application is from 1 to 10 minutes, preferably 2 to 5 minutes. After the probe molecules are applied, the carrier gas, i.e., Ar, may be applied alone at a flow rate of 500 to 1000 SCCM, preferably 600 to 1000 SCCM under a pressure in the range of from 30 to 600 mtorr, preferably from 50–400 mtorr. The duration of the application is from 3 to 10 minutes, preferably 5 to 10 minutes, to remove unreacted probe molecules from the plasma chamber.

In the fifth aspect of the invention, a method is directed to treating the microcup surface with a staining agent such as a solution or dispersion of carbon black, graphite, $OsO_4$, $Cr_2O_7^{-2}$, $MnO_4^{-1}$, $RuO_4$ or other types of metal oxides, to darken or oxidize the microcup surface and/or improve the interaction with the pigment particles. The staining agent is usually dissolved or dispersed in a solvent. Suitable solvents include alcohols, ethers, toluene, water and the like, with 2-methyl-2-propanol as the most preferred. The concentration of the staining agent in solution or dispersion typically ranges from 0.1–20 wt %, preferably 0.5–5 wt %. The microcups may be immersed or dipped into the staining solution or dispersion and allowed enough time for the staining reaction to complete. In a roll-to-roll process, the microcups may be stained by passing the web through a staining bath or overcoat the staining agent onto the microcups followed by heating, rinsing, drying and optionally post curing after winding up the roll. In this treatment method, the staining agent, particularly the metal oxide molecules, interacts with the residual C=C double bonds in the thermoset or thermoplastic precursor material forming the microcups to generate a structure which has a high efficiency of absorbing light and, therefore, converts the microcup surface into a black matrix. The degree of the coloration of the microcup surface can be controlled by the concentration of the staining agent and the duration of the treatment.

Alternatively, the staining agent may be mixed into the thermoset or thermoplastic precursor material forming the microcups before microembossing. A further option involves using the staining agent as a pre-stain for certain components which have C=C double bonds in a composition for forming the microcups and then mixing the resulting blackened components with other components to form a final microcup composition to be used in microembossing. All of these alternative methods are intended to be within the scope of the present invention.

This staining process can efficiently stain the surface of top regions of the microcup walls (24 in FIG. 2) which are in direct contact with the sealing layer (23 in FIG. 2). When the sealing layer is on the viewing side, the black surface of top regions significantly increases the Dmax, improves the contrast ratio and reduces the hue shift when a color display is viewed from an off angle.

In the sixth aspect of the invention, a method is directed to treating the microcup surface with a strong acid or base such as $H_2SO_4$, HCl, $HNO_3$, KOH, $K_2CO_3$, $NH_4OH$, ethylene diamine, diethylenetriamine or polyimine to induce surface functionality and microstructure of the surface for an improved interaction with the pigment particles. Similar to the staining process described previously, the acid or base may be diluted with a solvent such as water, toluene, an alcohol or an ether and applied to the microcup surface by, for example, an immersion, dipping, or coating process. Typical concentration of the acid or base solution is from 0.05–10 wt %, preferably 0.1–5 wt %.

In the seventh aspect of the invention, a method is directed to treating the microcup surface by sputtering, vapor deposition or electrodeposition of a metal or metal oxide to alter the conductivity, optical density and/or reflectivity of the microcup surface.

In all of the embodiments described above, in addition to the plasma treatment, other surface treatment methods such as corona, UV/Ozone, vapor deposition, sputtering or any combination thereof may also be used to achieve the same purpose for improving display performance.

EXAMPLES

Sheets of microcup used in the following examples were prepared by embossing of an ITO (Indium Tin Oxide) film coated on a 5 mil PET (polyethylene terephthalate) layer. The sheets were plasma treated according to the conditions indicated below.

In addition to the standard colorless microcups, blue and black colored microcups were also prepared to reduce the light leakage.

The microcups were then filled with an electrophoretic dispersion, sealed with a polymeric layer and finally laminated with a second electrode plate. All of these preparation steps were carried out according to WO 01/67170. For treatment with osmium tetroxide, untreated cup substrates were stored in desiccators and all operations were performed in fume hoods.

Examples 1–3

An oxygen plasma was applied first to the surface of the microcups at a flow rate of 250 SCCM under vacuum pressure of 150 mtorr and plasma power of 350 watts, for three minutes.

An acrylic acid plasma was then applied at the rate of 12 ml per hour with the carrier gas, Ar, at a flow rate of 50 SCCM under vacuum pressure of 90 mtorr. The plasma power was applied at 75 watts (Example 1), 100 watts (Example 2), and 125 watts (Example 3), for 5 minutes.

Finally, Ar was applied alone at 800 SCCM under vacuum pressure of 430 mtorr for 3 minutes.

Examples 4–7

Ammonia gas was applied to the surface of microcups with carrier gas, Ar, at a flow rate of 25 SCCM. The dosages of the ammonia gas applied were as follows:

| Experiment | Power | Pressure |
| --- | --- | --- |
| 4 | 400 watts | 120 mtorr |
| 5 | 200 watts | 120 mtorr |

-continued

| Experiment | Power | Pressure |
|---|---|---|
| 6 | 400 watts | 150 mtorr |
| 7 | 200 watts | 150 mtorr |

The application lasted for 5 minutes after which the Ar gas alone was applied under pressure of 525 mtorr for additional 3 minutes.

Results for Plasma Treatments

Table 1 summarizes the performance of colorless microcups treated under the conditions of Experiment 6, compared with that of untreated microcups, at driving voltages of 30V and 50V. The cells were filled with a positively charged pigment dispersion.

TABLE 1

| | Dmax | | Dmin | | Contrast | |
|---|---|---|---|---|---|---|
| | With treatment | Without treatment | With treatment | Without treatment | With treatment | Without treatment |
| 30 V | 1.71 | 1.62 | 0.75 | 0.93 | 9.12 | 4.90 |
| 50 V | 1.81 | 1.72 | 0.75 | 0.93 | 11.48 | 6.17 |

Table 2 summarizes the performance of blue colored microcups treated under the conditions of Experiment 2, compared with that of untreated blue colored microcups, at driving voltages of 30V and 50V. The cells were filled with a positively charged pigment dispersion.

TABLE 2

| | Dmax | | Dmin | | Contrast | |
|---|---|---|---|---|---|---|
| | With treatment | Without treatment | With treatment | Without treatment | With treatment | Without treatment |
| 30 V | 1.79 | 1.72 | 0.84 | 0.9 | 8.91 | 6.61 |
| 50 V | 1.9 | 1.86 | 0.8 | 0.87 | 12.59 | 9.77 |

Table 3 summarizes the performance of black microcups treated under the conditions of Experiment 7, compared with that of untreated black microcups, at driving voltages of 30V and 50V. The cells were filled with a negatively charged pigment dispersion.

TABLE 3

| | Dmax | | Dmin | | Contrast | |
|---|---|---|---|---|---|---|
| | With treatment | Without treatment | With treatment | Without treatment | With treatment | Without treatment |
| 30 V | 1.69 | 1.08 | 0.81 | 1.04 | 7.59 | 1.10 |
| 50 V | 1.75 | 1.09 | 0.75 | 1.03 | 10.00 | 1.15 |

Example 8

This example illustrates the metal oxide treatment. A microcup panel prepared from the embossing process was completely immersed in a 2.5% solution of $OsO_4$ in 2-methyl-2-propanol (Aldrich) for 8 hours with care to avoid trapping air bubbles. The microcup panel was then removed from the staining solution, rinsed thoroughly with 2-methyl-2-propanol (HPLC grade) and distilled water. The microcup panel was then drained, dried with a dry nitrogen flow in a UV oven for 10 minutes and then stored in a desiccator.

Table 4 summarizes the contrast ratio of the treated microcups, compared with that of untreated microcups, at driving voltages of 30V, 50V and 80V, respectively.

TABLE 4

| | 30 V | 50 V | 80 V |
|---|---|---|---|
| Untreated Microcups | 2 | 4 | 6 |
| $OSO_4$ Treated Microcups | 6 | 14 | >20 |

Although the foregoing invention has been described in some detail for purpose of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for improving the performance of an electrophoretic display comprising display cells, which process comprises plasma treatment of said display cells with probe molecules.

2. The method of claim 1 wherein said display cells are microcups prepared by embossing.

3. The method of claim 1 wherein said display cells are filled with an electrophoretic fluid comprising charged pigment particles dispersed in a dielectric solvent or solvent mixture.

4. The method of claim 3 wherein said filled display cells are individually sealed with a polymeric sealing layer.

5. The method of claim 3 wherein the surface of said treated display cells comprises an electron donor or proton acceptor.

6. The method of claim 5 wherein the cell surface is positively charged in the presence of the electrophoretic fluid.

7. The method of claim 6 wherein the pigment particles are density matched to the dielectric solvent of the electrophoretic fluid.

8. The method of claim 6 wherein the pigment particles are positively charged.

9. The method of claim 6 wherein the pigment particles are negatively charged.

10. The method of claim 3 wherein the surface of said treated display cells comprises an electron acceptor or proton donor.

11. The method of claim 10 wherein the cell surface is negatively charged in the presence of the electrophoretic fluid.

12. The method of claim 11 wherein the pigment particles are density matched to the dielectric solvent of the electrophoretic fluid.

13. The method of claim 11 wherein the pigment particles are positively charged.

14. The method of claim 11 wherein the pigment particles are negatively charged.

15. The method of claim 3 wherein the surface of said treated display cells comprises both an electron donor or proton acceptor and an electron acceptor or proton donor.

16. The method of claim 15 wherein said probe molecule is selected from a group consisting of ammonia, amines, imines, ureas, thioureas, urethanes, pyrrolidones, acrylamides, carboxylic acids, alcohols, thiols and silanols.

17. The method of claim 3 wherein the surface of said display cells is modified to have a functional group capable of hydrogen bonding or acid-base interaction with another functional group on the surface of the pigment particles.

18. The method of claim 17 wherein said hydrogen bonding or acid-base interaction is formed from a proton donor or electron acceptor on the cell surface and a proton acceptor or electron donor on the particles.

19. The method of claim 17 wherein said hydrogen bonding or acid-base interaction is formed from a proton acceptor or electron donor on the cell surface and a proton donor or electron acceptor on the particles.

20. The method of claim 1 wherein said probe molecule is selected from a group consisting of ammonia, amines, imines, pyridines, ureas, thioureas, urethanes, pyrrolidones, imidazoles, ethers, thioethers, ketones, acrylates and acrylamides.

21. The method of claim 20 wherein said probe molecule is ammonia gas.

22. The method of claim 1 wherein said probe molecule is selected from a group consisting of carboxylic acids, hydroxy containing compounds, acrylamides, silanols and organometallic compounds comprising an electron deficient center.

23. The method of claim 22 wherein said carboxylic acid is acrylic acid, methacrylic acid, maleic acid or itaconic acid.

24. The method of claim 23 wherein said carboxylic acid is acrylic acid.

25. The method of claim 22 wherein said hydroxy containing compound is 2-hydroxyethylacrylate or 2-hydroxyethylmethacrylate.

26. The method of claim 22 wherein said organometallic compound is organotin, organotitanium, organoaluminum or organoboron.

27. The method of claim 1 wherein the surface of said display cells is modified to be coated with a protective colloid layer.

28. The method of claim 27 wherein said protective colloid layer is a polymer or oligomer layer formed of a material selected from a group consisting of fluorinated acrylates or methacrylates, fluorinated vinyls, fluorinated epoxides and derivatives thereof.

29. The method of claim 28 wherein said fluorinated acrylate or methacrylate is selected from the group consisting of 2,2,3,3,3-pentafluoropropyl acrylate, 1H,1H,-heptafluorobutyl methacrylate, 1H,1H-heptafluorobutyl acrylate and 1H,1H,7H-dodecafluoroheptyl acrylate.

30. The method of claim 28 wherein said fluorinated vinyl is selected from the group consisting of perfluoropropylene, perfluorobutylene-1, perfluoroheptene-1, allyl-1H,1H-perfluorooctyl ether, 2H-hexafluoropropyl allyl ether, bis(perfluorooctyl)maleate, mono-perfluorooctyl itaconate, bis(perfluorooctyl)itaconate, 2-chloroheptafluoro-2-butene, 2-chloropentafluoro-1,3-butadiene and 1,8-divinylperfluorooctane.

31. The method of claim 28 wherein said fluorinated epoxide is selected from the group consisting of perfluorinated propylene oxide and 2-(1H,1H-nonafluoropentyl) oxirane.

32. A method for improving the performance of an electrophoretic display comprising display cells, which process comprises surface treatment of said display cells with carbon black, graphite or a metal oxide.

33. The method of claim 32 wherein said display cells are microcups prepared by embossing.

34. The method of claim 32 wherein said display cells are filled with an electrophoretic fluid comprising charged pigment particles dispersed in a dielectric solvent or solvent mixture.

35. The method of claim 34 wherein said filled display cells are individually sealed with a polymeric sealing layer.

36. The method of claim 32 wherein the surface of said display cells is treated with carbon black or graphite.

37. The method of claim 32 wherein said metal oxide is $Cr_2O_7^{-2}$, $MnO_4^{-1}$, $OsO_4$ or $RuO_4$.

38. The method of claim 37 wherein said metal oxide treatment is carried out by immersing or dipping the display cells into a solution or dispersion of said metal oxide.

39. The method of claim 38 wherein said metal oxide treatment is carried out by overcoating the solution or dispersion of said metal oxide onto the display cells.

40. The method of claim 38 wherein said solution or dispersion is formed by dissolving or dispersing said metal oxide in 2-methyl-2-propanol.

41. A method for improving the performance of an electrophoretic display comprising display cells, which process comprises surface treatment of said display cells by sputtering, vapor deposition or electrodeposition of a metal or metal oxide.

42. The method of claim 41 wherein said display cells are microcups prepared by embossing.

43. The method of claim 41 wherein said display cells are filled with an electrophoretic fluid comprising charged pigment particles dispersed in a dielectric solvent or solvent mixture.

44. The method of claim 43 wherein said filled display cells are individually sealed with a polymeric sealing layer.

45. An electrophoretic display comprising an array of display cells wherein said display cells are filled with an electrophoretic fluid comprising charged pigment particles dispersed in a dielectric solvent or solvent mixture and said display cells are surface treated with probe molecules, surface treated with a protective colloid layer, surface treated to induce hydrogen bonding or acid-base interaction, surface treated with a staining agent, surface treated by sputtering, vapor deposition or electrodeposition of a metal or metal oxide, or surface treated with a strong acid or base.

46. The electrophoretic display of claim 45 wherein said display cells have a positive surface charge in the presence of the electrophoretic fluid.

47. The electrophoretic display of claim 46 wherein the surface of said display cells is treated with ammonia.

48. The electrophoretic display of claim 45 wherein said display cells have a negative surface charge in the presence of the electrophoretic fluid.

49. The electrophoretic display of claim 48 wherein the surface of said display cells is treated with acrylic acid.

50. The electrophoretic display of claim 45 wherein the surface of said display cells is coated with a protective polymeric layer.

51. The electrophoretic display of claim 50 wherein the surface of said display cells is treated with a material selected from a group consisting of fluorinated acrylates or methacrylates, fluorinated vinyls, fluorinated epoxides and derivatives thereof.

52. The electrophoretic display of claim 45 wherein the surface of said display cells has a functional group capable of hydrogen bonding or acid-base interaction with another functional group on the surface of the pigment particles.

53. The electrophoretic display of claim 52 wherein said hydrogen bonding or acid-base interaction is formed from a proton donor or electron acceptor on the surface of said display cells and a proton acceptor or electron donor on the particles.

54. The electrophoretic display of claim 52 wherein said hydrogen bonding or acid-base interaction is formed from a proton acceptor or electron donor on the surface of said display cells and a proton donor or electron acceptor on the particles.

55. The electrophoretic display of claim 52 wherein the surface of said display cells comprises both an electron donor or proton acceptor and an electron acceptor or proton donor.

56. The electrophoretic display of claim 45 wherein said display cells are microcups prepared by embossing and filled with an electrophoretic fluid.

57. The electrophoretic display of claim 56 wherein said filled microcups are individually sealed with a polymeric sealing layer.

58. The electrophoretic display of claim 45 wherein the surface of said display cells is treated with a metal oxide.

59. The electrophoretic display of claim 58 wherein said metal oxide is $Cr_2O_7^{-2}$, $MnO_4^{-1}$, $OsO_4$ or $RuO_4$.

60. The eletrocphoretic display of claim 45 wherein the surface of said display cells is treated with carbon black or graphite.

61. The electrophoretic display of claim 45 wherein the surface of said display cells is modified by sputtering, vapor deposition or electrodeposition of a metal or metal oxide.

62. A method for improving the performance of an electrophoretic display comprising display cells, the method comprising surface treatment of said display cells with a strong acid or base.

63. The method of claim 62 wherein said strong acid or base is $H_2SO_4$, HCl, $HNO_3$, KOH, $K_2CO_3$, $NH_4OH$, ethylene diamine, diethylenetriamine or polyimine.

* * * * *